United States Patent [19]

Morito

[11] Patent Number: 5,537,130
[45] Date of Patent: Jul. 16, 1996

[54] SYSTEM FOR CONTRACTING BIT MAP IMAGE DATA

[75] Inventor: Masao Morito, Kawasaki, Japan

[73] Assignee: Fujitsu Limited, Kanagawa, Japan

[21] Appl. No.: 292,023

[22] Filed: Aug. 18, 1994

[30] Foreign Application Priority Data

Dec. 22, 1993 [JP] Japan .................. 5-323467

[51] Int. Cl.6 .......................................... G09G 5/00
[52] U.S. Cl. .................... 345/127; 345/131; 395/155
[58] Field of Search .................... 345/127–131, 345/121, 118, 132; 382/47, 232, 243, 298, 299, 305; 358/537, 451, 538

[56] References Cited

U.S. PATENT DOCUMENTS

| | | | |
|---|---|---|---|
| 4,628,534 | 12/1986 | Marshall | 382/47 |
| 4,829,370 | 5/1989 | Mayne et al. | 358/537 |
| 4,831,556 | 5/1989 | Oono | 345/121 |
| 4,881,069 | 11/1989 | Kameda et al. | 382/47 |
| 4,892,258 | 1/1990 | Sakuragi | 382/47 |
| 5,172,103 | 12/1992 | Kita | 345/127 |
| 5,239,287 | 8/1993 | Siio et al. | 345/163 |

FOREIGN PATENT DOCUMENTS

| | | |
|---|---|---|
| 179204 | 4/1986 | European Pat. Off. . |
| 177640 | 4/1986 | European Pat. Off. . |
| 63-41990 | 2/1987 | Japan . |

*Primary Examiner*—Steven Saras
*Attorney, Agent, or Firm*—Staas & Halsey

[57] ABSTRACT

A system for contracting bit map image data to allow interactive correction of an image that has been brought out of shape when the bit map image data are contracted at a certain magnification. The system includes a memory for storing original bit map image data and contracted bit map image data, a decimating unit for decimating from the original bit map image data dot data at decimating positions in rows and/or columns which have been determined in advance according to a given contraction ratio, a display unit for displaying the original bit map image data, decimating positions, and the contracted bit map image data, and a shift indicating unit for indicating a shift of the decimating positions while viewing the images displayed by the display unit. The system permits the operator to shift the decimating positions in an interactive manner for minimizing any loss in the contracted bit map image of major figure elements contained in the original bit map image.

4 Claims, 6 Drawing Sheets

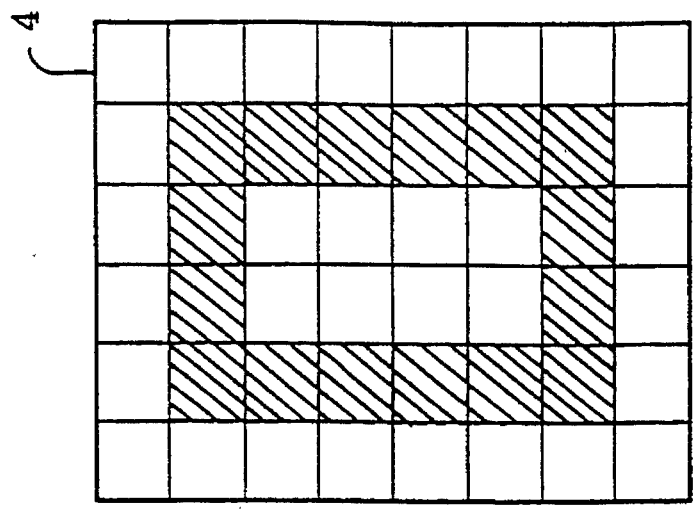
FIG. 1 (B) PRIOR ART
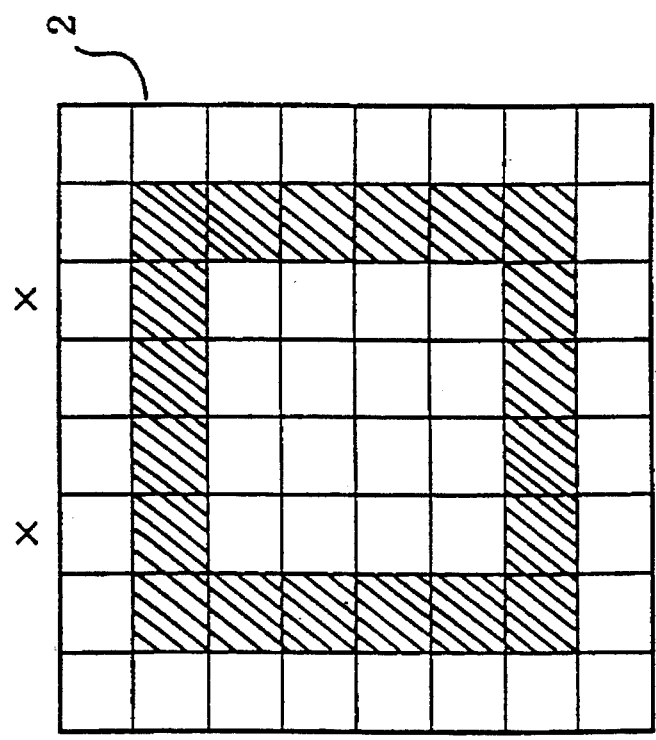
FIG. 1 (A) PRIOR ART

SYSTEM FOR CONTRACTING BIT MAP IMAGE DATA

BACKGROUND OF THE INVENTION

1. Field of the Invention

The present invention relates to a system for contracting bit map image data, and more particularly, to a bit map image data contracting system which allows interactive correction of an image that has been brought out of shape when the bit map image data are contracted at a certain magnification on an apparatus operating in a computer graphics application.

2. Description of the Related Art

Apparatuses operating in a computer graphics application, such as CAD (Computer-Aided Design) systems, employ many displayed icons which are graphics representations of various functions that are required for the user to draw figures on a display screen. When an icon displayed on the display screen is indicated by a mouse pointer, for example, the function assigned to the icon is performed. These icons are composed of bit map image data. Icons are carried by the CAD systems themselves, and, in addition, some customized icons are uniquely generated by users.

In an apparatus operating in a computer graphics application, the reduced size of an icon or icons may be required when the version of an existing program run by the apparatus is changed. For example, such a reduction in the size of an icon or icons may be either necessary when the increase of the number of icons which are simultaneously displayed on the display screen is required, or necessitated in view of a screen display arrangement, or for reasons of the system. An icon composed of bit map image data can be reduced in size or contracted by appropriately decimating dot data according to the contraction ratio.

FIGS. 1(A) and 1(B) of the accompanying drawings show a conventional method of contacting bit map image data. FIG. 1(A) shows an original representation 2 of bit map image data having an original size 8×8 dots. FIG. 1(B) illustrates a contracted representation 4 of contracted bit map image data. In FIGS. 1(A) and 1(B), when displayed on a display unit, white pixels or dots in the square pixels in the original representation 2 and the contracted representation 4 are recognized as white pixels, and hatched pixels or dots which represent figures are recognized as black pixels. The data of the white pixels are of a value "0" and the data of the hatched pixels are of a value "1". In the illustrated example, the bit map image data are contracted only in the horizontal direction. However, bit map image data are usually contracted in both the horizontal and vertical directions.

The original representation 2 includes pixels marked with "X", and two pixel columns including these marked are to be decimated from the bit map image data. When the two pixel columns are decimated from the original representation 2, the original representation 2 is converted into the contracted representation 4 whose horizontal dimension has been reduced at a contraction ratio of 75%. The bit map image data can be contracted to a desired size by setting the number of rows or columns of pixels to be decimated from the original representation 2 to a number depending on the contraction ratio.

Bit map image data representing an icon are expressed by a relatively small number of dots, and a vertical or horizontal line segment thereof may be drawn with a minimum dot width. If such a line segment happens to coincide with a row or column of pixels to be decimated from the original representation 2, then the line segment is eliminated in its entirety, and the bit map image data may sometimes be contracted to a shape dissimilar to the original shape or entirely different from the image of the original representation 2. For example, if one of the columns of pixels to be decimated in FIG. 1(A) is shifted one dot to the left or right, then one of the vertical line segments represented by hatched square pixels will be decimated as a whole, with the result that the contracted bit map image data represent a C-shaped figure. When such a problem arises, it has heretofore been necessary to modify the contracted figure with an editor or the like.

The modification does not cause a substantial problem if the number of bit map image data is small. However, if icons are provided in such a hierarchical arrangement that when one icon is opened, a next icon appears, then the number of icons used may reach up to several hundreds, and it will be very laborious to rewrite the icons one by one manually. Since many users generate their own icons using the customizing function, it is desirable that these customized icons be contracted to images which remain essentially the same as the image of the original representation 2.

SUMMARY OF THE INVENTION

It is therefore an object of the present invention to provide a system for contracting bit map image data in an interactive manner which allows the user to visually confirm an original representation of the bit map image data.

Another object of the present invention is to provide a system for contracting bit map image data, the system being capable of shifting all decimating positions in an original representation of the bit map image data bit by bit.

Still another object of the present invention is to provide a system for contracting bit map image data, the system being capable of shifting any optional one of decimating positions in an original representation of the bit map image data by a desired number of bits.

According to the present invention, there is provided a system for contracting bit map image data which allows the bit map image data to be contracted in an interractive manner without losing an original image thereof. The system comprises memory means having a storage area for storing original bit map image data and a storage area for storing contracted bit map image data, decimating means for decimating from the original bit map image data dot data at decimating positions in rows and/or columns which have been determined in advance according to a given contraction ratio, thereby to convert the original bit map image data into the contracted bit map image data, display means for simultaneously displaying the original bit map image data, decimating positions with respect to the original bit map image data in rows and columns which have been determined in advance, and the contracted bit map image data which have been decimated by the decimating means, and shift indicating means for indicating a shift of the decimating positions in rows and/or columns of the original bit map image data, to the decimating means.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIGS. 1(A) and 1(B) are diagrams illustrative of a conventional method of contracting bit map image data;

DETAILED DESCRIPTION OF THE PREFERRED EMBODIMENTS

Figure 2:
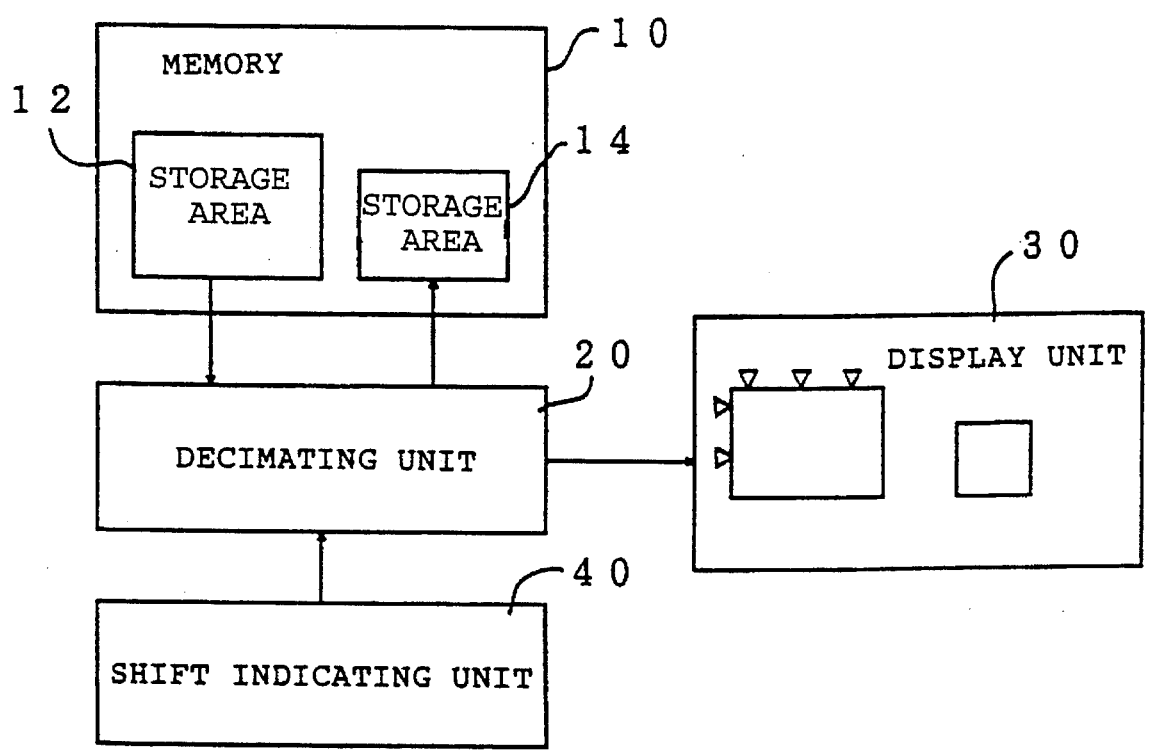
FIG. 2 is a block diagram of a system for contracting bit map image data according to the present invention.

The principles of the present invention are particularly useful when embodied in a system, as shown in FIG. 2, for contracting bit map image data. The system shown in FIG. 2 allows the user to contract bit map image data in an interactive manner without losing an original image thereof.

As shown in FIG. 2, the system has a memory 10 having a storage area 12 for reading and storing original bit map image data from a storage medium such as a hard disk, for example, when such original bit map image data are to be contracted, and a storage area 14 for storing contracted bit map image data. The system also has a decimating unit 20 for contracting the bit map image data. The decimating unit 20 decimates from original bit map image data dot data at decimating positions in horizontal rows of pixels and/or vertical columns of pixels which have been determined in advance according to a given contraction ratio, thereby converting the original bit map image data into contracted bit map image data. The system further includes a display unit 30 for displaying an original bit map image, a contracted bit map image decimated by the decimating unit 20, and decimating positions in predetermined rows and columns, and a shift indicating unit 40 for indicating a shift of decimating positions in rows and columns of the original bit map image to the decimating unit 20.

The original bit map image data stored in the storage area 12 of the memory 10 are displayed as they are on the display screen of the display unit 30, so that they can be referred to anytime during a contraction process. The display unit 30 also displays on its display screen the original bit map image together with decimating position indicators indicative of decimating positions in rows and columns which have been determined in advance according to the contraction ratio, and the bit map image which has been decimated at the decimating positions by the decimating unit 20. The data of the decimated bit map image are stored in the storage area 14 of the memory 10. If the bit map image decimated by the decimating unit 20 is dissimilar to the original bit map image, then a shift of decimating positions is indicated to the decimating unit 20 by the shift indicating unit 40. The decimating unit 20 then decimates the original bit map image data at shifted decimating positions, and the display unit 30 instantaneously displays a newly decimated bit map image. Consequently, since the original bit map image and the contracted bit map image are simultaneously displayed and decimating positions can be shifted dot by dot while viewing the contracted image, the best contracted bit map image which is similar to the original bit map image can be interactively obtained.

Figure 3:
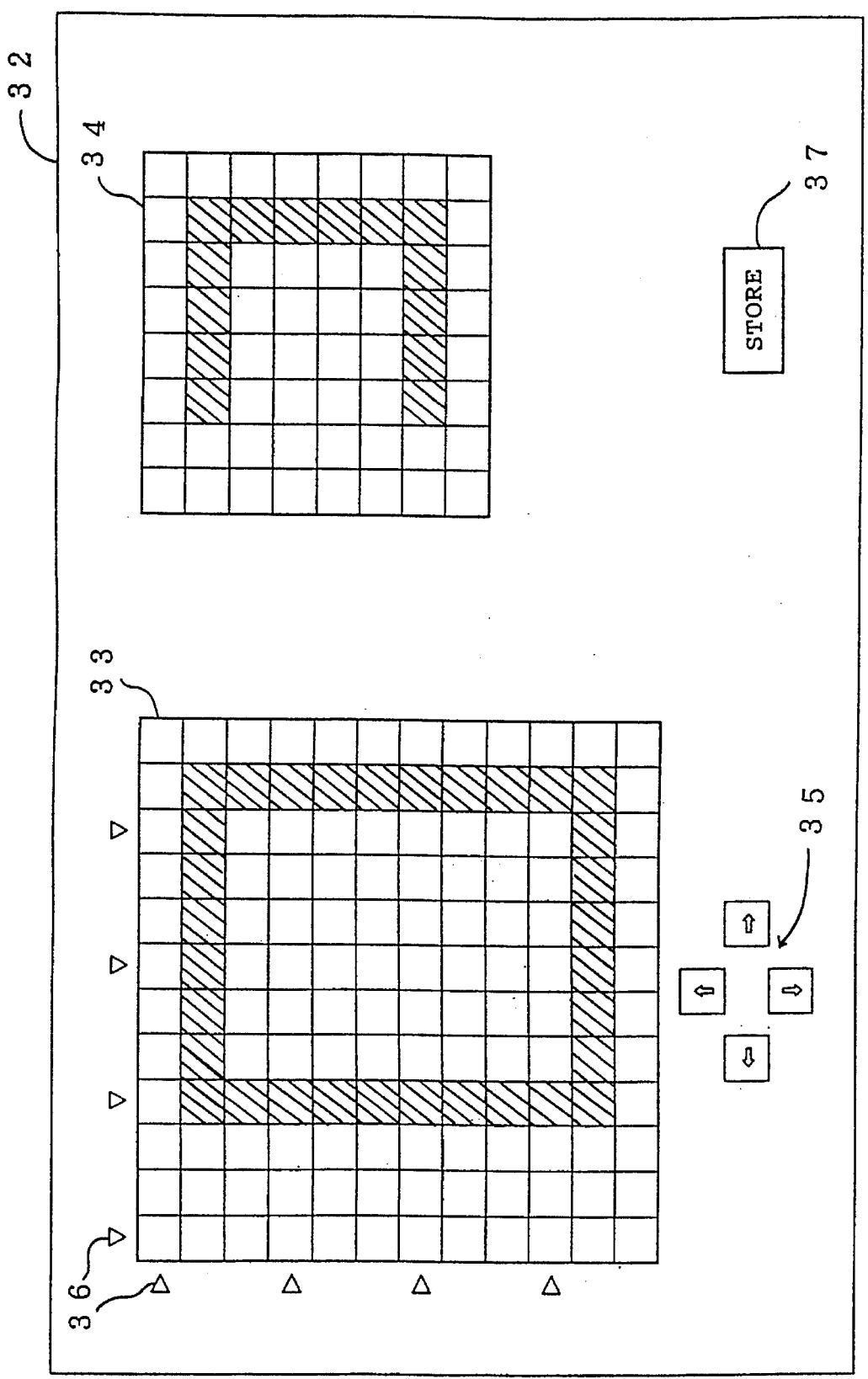
FIG. 3 is a view showing, by way of example, images displayed on the display screen of a display unit of the system shown in FIG. 2.

FIG. 3 shows, by way of example, images displayed on the display screen of the display unit 30. In the example shown in FIG. 3, an image composed of 12×12 dots is shown as being contracted to an image composed of 8×8 dots for illustrative purpose. The display screen, denoted by 32, of the display unit 30 displays an original image display area 33 for displaying original bit map image data, a converted image display area 34 for displaying contracted bit map image data, four decimating position whole shift buttons 35 for entering an instruction to move decimating positions dot by dot vertically and horizontally, horizontal and vertical arrays of decimating position indicators 36 for indicating decimating positions in rows and columns of pixels, and a completed data storage button 37 for entering an instruction to store contracted bit map image data.

The original image display area 33 displays original bit map image data stored in the storage area 12 of the memory 10. The decimating position indicators 36 indicate decimating positions in rows and/or columns which have been determined in advance according to a given contraction ratio. Initially, the decimating positions are spaced at equal intervals, which depend on the contraction ratio, along the rows and columns of pixels. In the example shown in FIG. 3, because the image composed of 12×12 dots is contracted to the image composed of 8×8 dots, 4 dots are decimated in each of the rows and columns. The 4 dots to be decimated are assigned at equal intervals to 1st, 4th, 7th, and 10th dots, respectively, as counted from each of upper and left edges of the original bit map image. The dot or pixel data in the rows and columns which are indicated by the decimating position indicators 36 are then decimated by the decimating unit 20, and the decimated bit map image data are displayed in the converted image display area 34.

In the example shown in FIG. 3, as a result of the decimation at the initial decimating positions, the original bit map image which is of a square shape is converted into a C-shaped bit map image. Inasmuch as the original bit map image is largely different from the converted bit map image, the decimating position whole shift buttons 35 is operated to change the decimating positions. For example, the operator presses an arrow key on a keyboard which is part of the shift indicating unit 40, or moves a displayed mouse pointer to one of the four decimating position whole shift buttons 35 and then clicks the mouse pointer, thereby shifting the selected array of decimating position indicators 36 as a whole bit by bit. The bit data in the rows or columns indicated by the shifted decimating position indicators 36 are decimated, and the decimated bit map image is immediately displayed in the converted image display area 34. In the example shown in FIG. 3, the decimating position whole shift button 35 with the right arrow is depressed twice, thus moving the horizontal array of decimating position indicators 36 by two bits to the right. With the decimating position indicators 36 thus moved, the decimating positions along the horizontal rows are no longer superimposed on major vertical image elements of the original bit map image. Consequently, a decimated bit map image similar to the original bit map image displayed in the original image display area 33 is now displayed in the converted image display area 34. If the contracted bit map image displayed in the converted image display area 34 is accepted, then the mouse pointer is moved to the completed data storage button 37 and is clicked. The data of the bit map image displayed in the converted image display area 34 are transferred from the storage area 14 of the memory 10 to a storage medium such as a hard disk, and stored therein. By shifting the decimating positions as a whole along rows and/or columns several times in most cases, a desired contracted bit map image can be generated.

According to another embodiment, instead of using the decimating position whole shift buttons 35 to shift the decimating position indicators 36 around the original image display area 33 as a whole, any desired one of the decimating position indicators 36 in the horizontal or vertical array may be shifted a desired number of bits using the mouse pointer. In the example shown in FIG. 3, since the decimating position indicator 36 in the horizontal array which is positioned at the fourth bit as counted from the left edge of the original image display area 33 coincides with a major vertical line segment of the original bit map image, this decimating position indicator 36 is dragged by one bit to the left or right with the mouse pointer. The decimating position indicated by this decimating position indicator 36 is now displaced out of alignment with the major vertical line segment of the original bit map image, so that a contracted bit map image can be obtained which is similar to the original bit map image displayed in the original image display area 33. The process of shifting a desired one of the decimating positions with the mouse pointer is effective to adjust a contracted bit map image with greater accuracy than the above process of shifting the decimating positions as a whole using the decimating position whole shift buttons 35.

Figure 4:
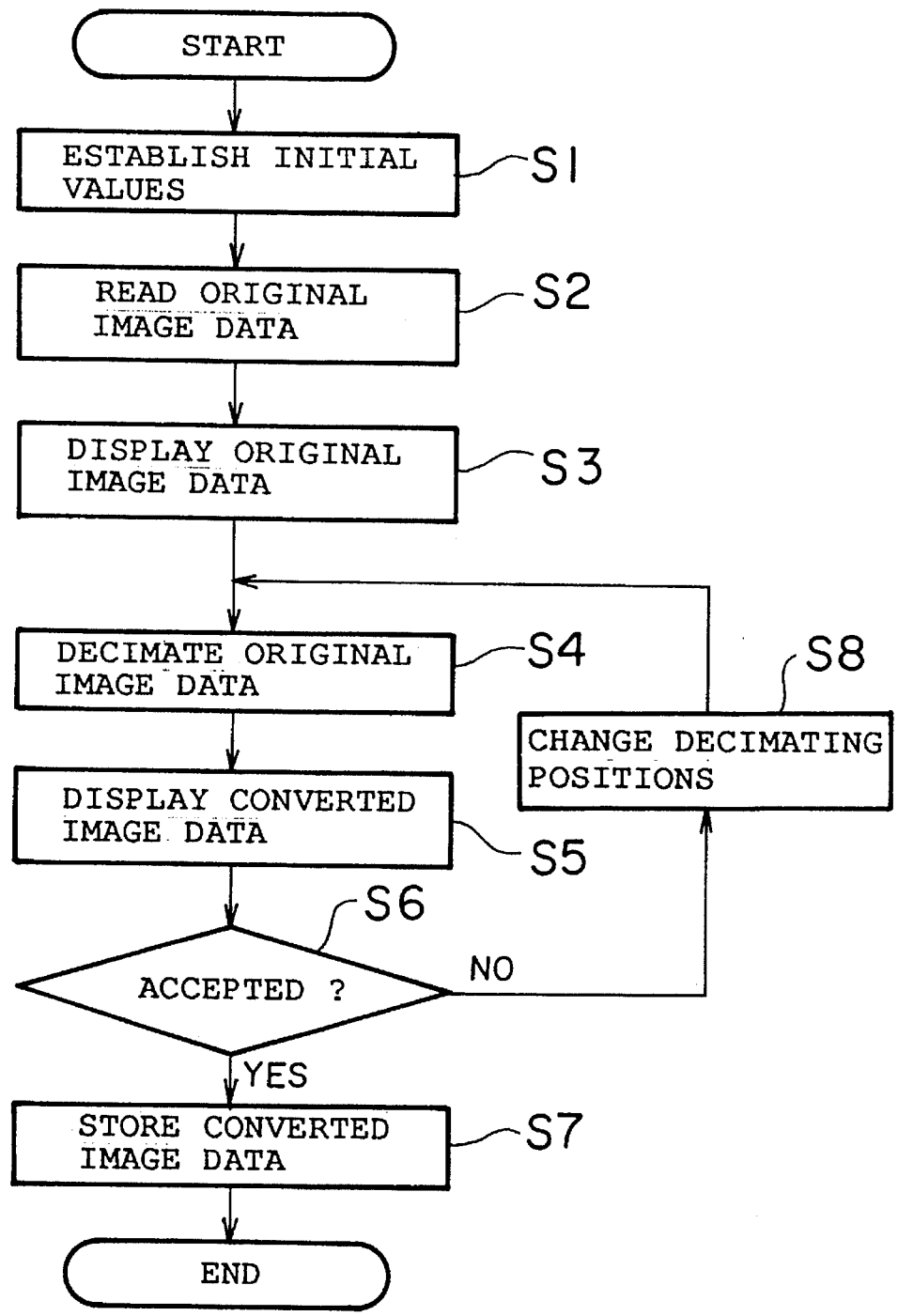
FIG. 4 is a flowchart of an operation sequence of the system for contracting bit map image data according to the present invention.

FIG. 4 shows an operation sequence of the system for contracting bit map image data according to the present invention. For contracting bit map image data, initial values are established in a step S1. Specifically, the numbers of rows and columns to be decimated and decimating positions are determined according to a given contraction ratio which indicates the size of a contracted bit map image as compared with the size of an original bit map image. The contraction ratio may be indicated by a percentage or the number of bits of a contracted bit map image. The number of bits may be given separately for vertical and horizontal dimensions of a contracted bit map image. If original and decimated bit map images are square in shape, then the number of horizontal bits and the number of vertical bits are the same as each other. Initial decimating positions or rows and columns to be decimated are spaced at equal intervals.

Then, the data of the original bit map image to be contracted are read from a storage medium into the storage area 12 of the memory 10 in a step S2. The original bit map image is displayed directly in the original image display area 33 on the display screen 32 of the display unit 30 in a step S3. Thereafter, the original bit map image data read into the storage area 12 are decimated by the decimating unit 20, and the decimated bit map image data are stored in the storage area 14 of the memory 10 in a step S4. The decimated bit map image based on the decimated bit map image data is displayed in the converted image display area 34 on the display screen 32 of the display unit 30 in a step S5.

The user views the decimated bit map image displayed in the converted image display area 34, and determines whether the displayed decimated bit map image has been converted as intended by the user in a step S6. If the user accepts the decimated bit map image, then the user presses the completed data storage button 37, so that the converted bit map image data are transferred from the storage area 14 of the memory 10 into the storage medium, and stored therein in a step S7.

If the user presses one of the decimating position whole shift buttons 35 or moves the mouse pointer to shift selected decimating position indicators 36 in the step S6, then the decimating positions are changed in a step S8. Thereafter, control returns to the step S4 in which the original bit map image data are decimated at the changed decimating positions.

Figure 5:
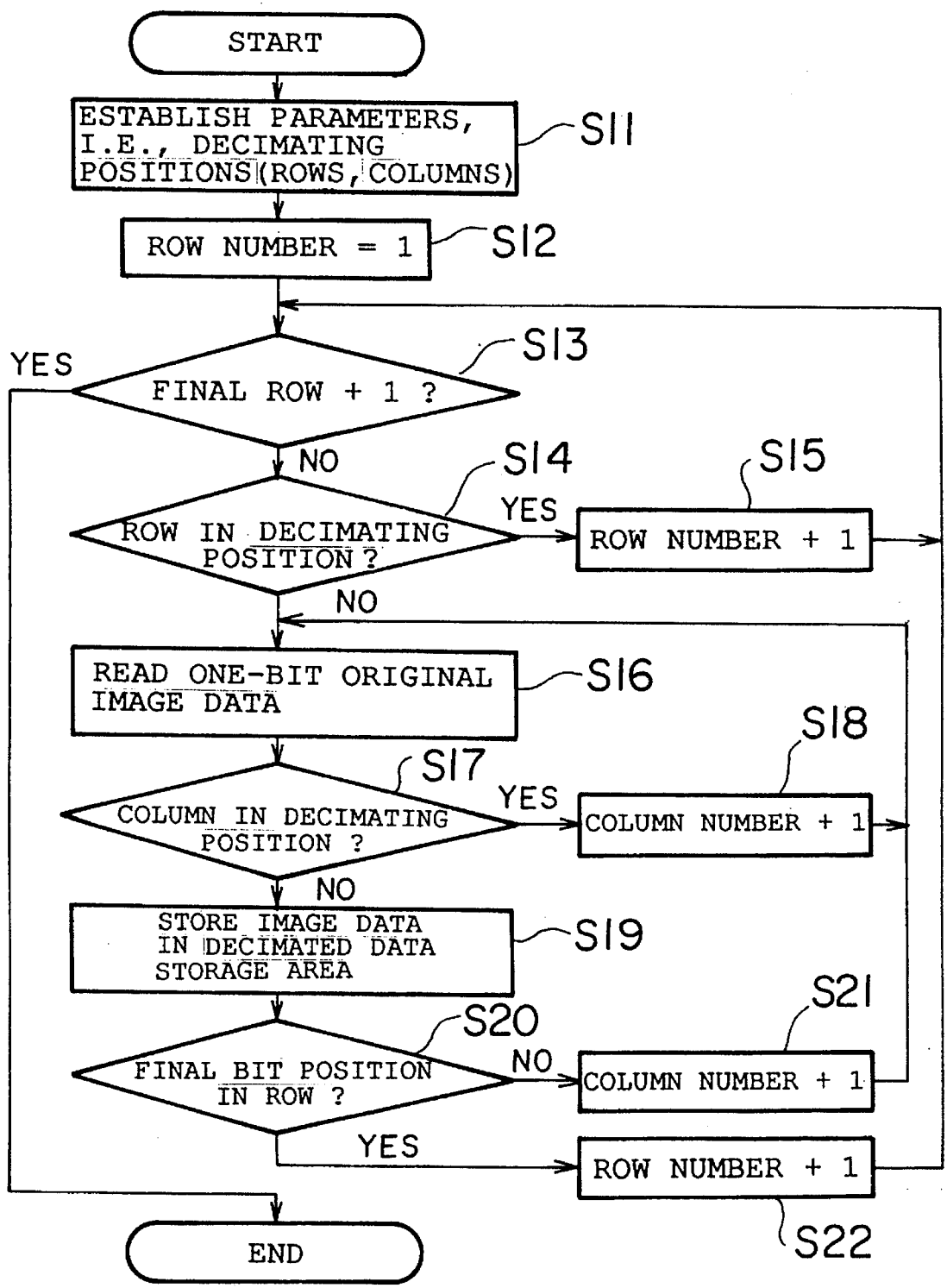
FIG. 5 is a flowchart of a decimating process.

FIG. 5 shows the decimating process which is carried out in the step S4. In the decimating process, parameters are first established in a step S11. Specifically, decimating position data indicative of rows and columns to be decimated are established. First, the decimating positions determined at equal intervals in the step S1 are established, and in second and following cycles, decimating positions changed by the decimating position whole shift buttons 35 or the mouse pointer are established. Then, the row number is set to "1" for decimating the data from the first row in a step S12, which is followed by a step S13 that determines whether the image data are ended.

If the image data are not ended, then a step S14 determines whether a row to be processed is a row in a decimating position, i.e., whether a row to be processed is the row to be decimated which has been established in the step S11. If a row to be processed is a row to be decimated, then control goes to the processing of data in a next row in a step S15. If a row to be processed is not a row to be decimated, then one-bit original bit map image data belonging to the row are read in a step S16. Thereafter, a step S17 determines whether the read one-bit original bit map image data belong to the column to be decimated which has been established in the step S11. If the read one-bit original bit map image data belong to the column to be decimated, then a step S18 makes it ready to read bit data in a next column, and then the bit data of the next column are read in the step S16. If the read one-bit original bit map image data do not belong to the column to be decimated, then the data are stored in the storage area 14 of the memory 10 in a step S19. Thereafter, a step S20 determines whether the one-bit original bit map image data stored in the memory 10 belong to the final column in the row. If this data does not belong to the final column, then a step S21 makes it ready to read bit data in a next column, after which control goes to the step S16. If belong to the final column, then a step S22 makes it ready to read bit data in a next row, after which control goes to the step S13.

Figure 6:
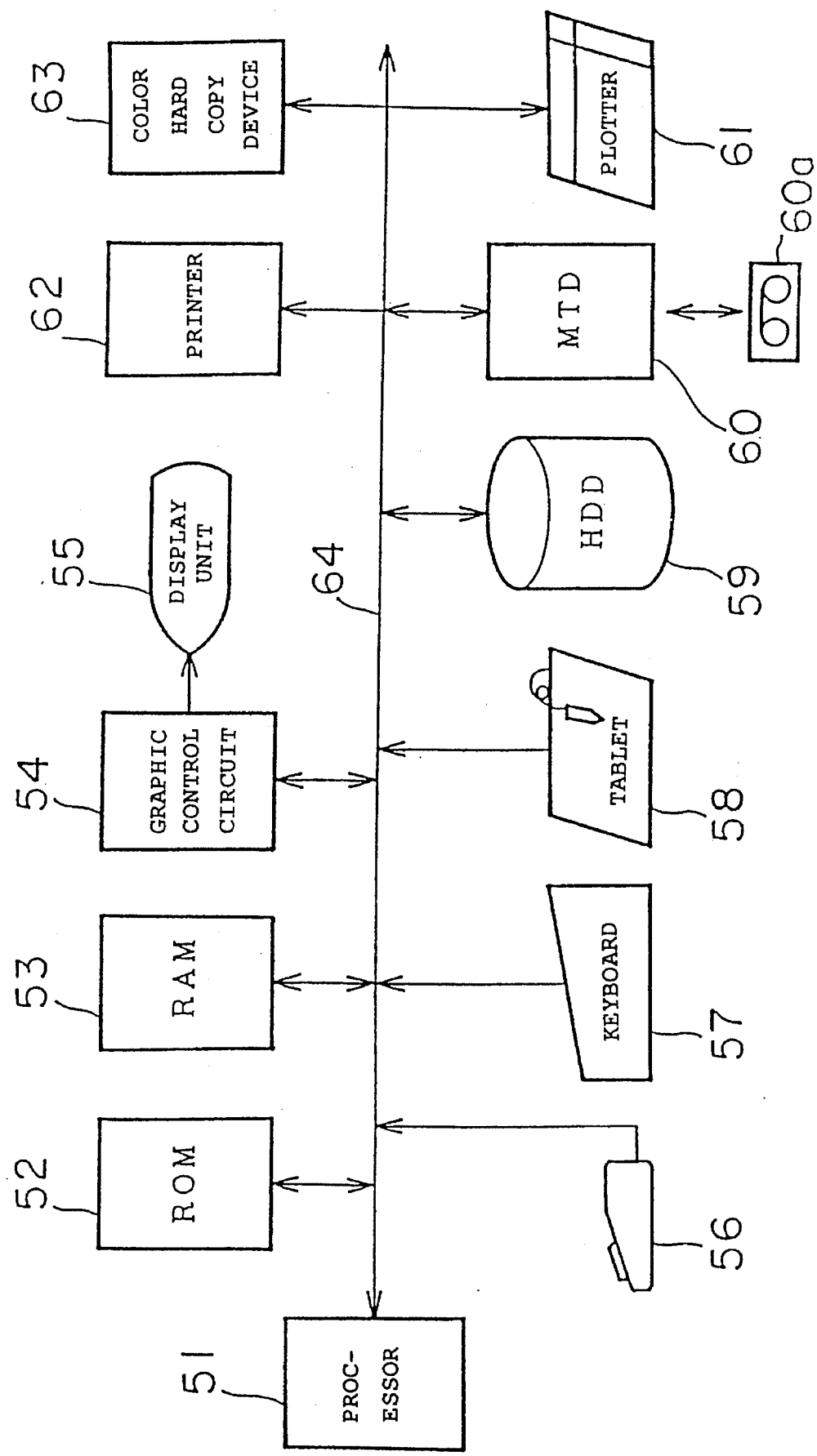
FIG. 6 is a block diagram of a specific hardware arrangement for implementing the system for contracting bit map image data according to the present invention.

FIG. 6 shows a specific hardware arrangement for implementing the system for contracting bit map image data according to the present invention. As shown in FIG. 6, a processor 51 controls the entire hardware arrangement according to a system program stored in a read-only memory (ROM) 52. A main memory 53 in the form of a random-access memory (RAM) stores an application program for operating a CAD system, including the decimating process, and also stores bit map image data to be decimated and bit map image data which have been decimated.

A graphic control circuit 54 converts original bit map image data, decimated bit map image data, decimating position indicators data, decimating position whole shift buttons data, and completed data storage button data, which are stored in the main memory 53, into display signals, and sends display signals to the display unit 55. In response to the supplied display signals, the display unit 55 displays an original bit map image, a decimated bit map image, and other images on its display screen.

A mouse 56 serves to move a mouse pointer displayed on the display screen of the display unit 55. When a button on the mouse 56 is clicked, the mouse 56 indicates one of the displayed decimating position whole shift buttons or the completed data storage button, drags any one of the decimating position indicators, or selects any one of various menus. A keyboard 57 is used to enter a decimation or contraction ratio and data indicative of the number of dots for contracting an original bit map image, and to operate any one of the decimating position whole shift buttons. A tablet 58 is used to enter coordinates when a figure is to be generated on a CAD system.

A hard disk device 59 stores an application program, a decimating program, and bit map images of icons, for example. A magnetic tape device 60 is an external storage device for entering data of design drawings from a magnetic tape 60a and storing data of generated design drawings on the magnetic tape 60a.

Contracted bit map image data may be outputted in the form of a list to a plotter 61, a printer 62, or a color hard copy device 63. The above components of the system are electrically connected to each other through interfaces (not shown) and a bus 64.

In the above embodiment, bit map image data are representative of icons which are used in a CAD system. However, the principles of the present invention are not limited to the contraction of the bit map image data of icons, but also applicable to the contraction of dot patterns of characters.

While bit map image data have been described as representing black-and-white images in the illustrated embodiment, the system according to the present invention can also contract color image data if each of dot data is replaced with 8-bit color data, for example.

With the present invention, as described above, when bit map image data are to be contracted, decimating positions can be interactively moved in rows and/or columns which have been determined in advance according to a given contraction ratio. Therefore, the system allows the user to generate contracted bit map image data simply and quickly as intended by the user.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A system for contracting bit map image data in an interactive manner preserving an original appearance thereof, the system comprising:

memory means having a first storage area for storing original bit map image data and a second storage area for storing contracted bit map image data;

decimating means for decimating from said original bit map image data dot data at decimating positions in at least one of rows and columns which have been determined in advance according to a given contraction ratio, thereby to convert the original bit map image data into the contracted bit map image data;

display means for simultaneously displaying the original bit map image data, the decimating positions with respect to the original bit map image data, and the contracted bit map image data which have been decimated by said decimating means; and shift indicating means for indicating a shift of the decimating positions to said decimating means, the shift being instructed by an operator of the system.

2. A system according to claim 1, wherein said decimating means shifts all the decimating positions bit by bit in the rows and columns which have been determined in advance according to the given contraction ratio, based on the shift indicated by said shift indicating means.

3. A system according to claim 1, wherein said decimating means shifts a selected one of the decimating positions in the rows and columns which have been determined in advance according to the given contraction ratio, by a selected number of bits indicated by said shift indicating means.

4. A system according to claim 1, wherein said shift indicating means has storage indicating means for producing an instruction to store the contracted bit map image data displayed by said display means in said memory means.

* * * * *